US008532954B2

(12) United States Patent
Sallee et al.

(10) Patent No.: US 8,532,954 B2
(45) Date of Patent: Sep. 10, 2013

(54) METHOD OF CHARACTERIZING A $CO_2$ PLUME IN A GEOLOGICAL STORAGE AQUIFER

(75) Inventors: Noalwenn Sallee, Paris (FR); Patrick Rasolofosaon, Les Ulis (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 409 days.

(21) Appl. No.: 13/017,299

(22) Filed: Jan. 31, 2011

(65) Prior Publication Data

US 2011/0196613 A1    Aug. 11, 2011

(30) Foreign Application Priority Data

Feb. 8, 2010  (FR) ...................... 10 00491

(51) Int. Cl.
*G06F 19/00* (2011.01)
*G01K 1/00* (2006.01)

(52) U.S. Cl.
CPC .................................... *G01K 1/00* (2013.01)
USPC ......................................................... 702/130

(58) Field of Classification Search
USPC .......................................... 702/130, 182–185
See application file for complete search history.

(56) References Cited

U.S. PATENT DOCUMENTS

2002/0013687 A1  1/2002 Ortoleva

OTHER PUBLICATIONS

DeVault, Bryan, et al: 2007 "Pre-Stack 9-C Joint Inversion for Stratigraphic Prediction in the Williston Basin." 77th SEG Annual International Meeting, Expanded Abstracts, p. 1039-1043.
Rasolofosaon, Patrick N.J., et al: 2007. "The Unreasonable Success of Gassmann's Theory . . . Revisited, Journal of Seismic Exploration," vol. 16, No. 2-4, pp. 281-301.
Chadwick, R.A., et al: 2005, "4D Seismic Quantification of a Growing $CO_2$ Plume at Sleipner, North Sea," In: DORE', A.G. & Vining, B.A. (eds) Petroleum Geology: North-West.
Calvert, R.: 2005, "Insights and Methods for 4D Reservoir Monitoring and Characterization," SED/EAGE DISC (Distinguished Lecture Course), 2005.pp. i-ii, iv-xii and 1-219.
Rasolofosaon, P. et al: 2004, "Laboratory Petroacoustics for Seismic Monitoring Feasibility Study." The Leading Edge, v. 23; No. 3, Mar. 2004, pp. 252-258.
Barnola, Anne-Sophie, et al: 2003 "Pre-Stack Stratigraphic Inversion and Attribute Analysis for Optimal Reservoir Characterisation," SEG Expanded Abstracts 22, 1493, 4 pgs. (2003); doi:10.1190/1.1817576.
Arts, R., et al: 2002. "Estimation of the Mass of Injected $CO_2$ at Sleipner Using Time-Lapse Seismic Data", Expanded Abstracts of the 64th EAGE, Florence, Italy May 27-30, 2002, paper H016.

(Continued)

*Primary Examiner* — Edward Raymond
(74) *Attorney, Agent, or Firm* — Antonelli, Terry, Stout & Kraus, LLP.

(57) ABSTRACT

A method of monitoring a $CO_2$ geological storage site by locating the $CO_2$ plume from 4D seismic data is disclosed. A stratigraphic inversion of the seismic data is performed in order to obtain the P and S impedances, before and after $CO_2$ injection. A density variation cube and an incompressibility modulus variation cube are constructed from the seismic impedances. The free $CO_2$ plume is located within the subsoil by identifying, within the cubes cells where the density variation is negative and where the incompressibility modulus variation is negative, which are of an absolute value greater than a given positive threshold.

25 Claims, 4 Drawing Sheets

(56) References Cited

OTHER PUBLICATIONS

Tonellot, T., et al: 2001 "Joint Stratigraphic Inversion of Angle-Limited Stacks." 71$^{st}$ SEG Annual International Meeting, San Antonio, Texas, Sep. 9-14, 2001, Expanded Abstracts, pp. 227-230.

Tonellot, T, et al: 1999 "Prestack Elastic Waveform in Version Using a priori Information," 69$^{th}$ Ann. Internat. Tg: Soc. of Expl. Geophys., paper 0231, p. 800-804.

Span, R., et al: 1996 "A New Equation of State for Carbon Dioxide Covering the Fluid Region from the Triple-Point Temperature to 100 K at Pressures up to 800 MPa," J. Phys. Chem. Ref. Data, vol. 25, No. 6, pp. 1509-1596.

Lumley, David: "4D Seismic Monitoring of $CO_2$ Sequestration," The Leading Edge, Feb. 1, 2010, pp. 150-155, XP002616868.

Chadwick, Andy et al: "Quantitative Analysis of Time-Lapse Seismic Monitoring Data at the Sleipner $CO_2$ Storage Operation," The Leading Edge, Feb. 1, 2010, pp. 170-177, XP002616869.

Vanorio, Tiziana, et al: "The Rock Physics Basis for 4D Seismic Monitoring of $CO_2$ Fate: Are We There Yet?" The Leading Edge, Feb. 1, 2010, XP002616870, pp. 156-162.

Harris, Jerry M.: "Seismic Monitoring of $CO_2$ Sequestration," GCEP Technical Report, 2006, XP002616871, pp. 1-8.

METHOD OF CHARACTERIZING A $CO_2$ PLUME IN A GEOLOGICAL STORAGE AQUIFER

BACKGROUND OF THE INVENTION

1. Field of the Invention

The invention relates to the technical sphere of geological storage of greenhouse gas such as carbon dioxide ($CO_2$), and more particularly to the monitoring of geological storage sites for such gases.

2. Description of the Prior Art

The scenarios established by the IPCC (Intergovernmental Panel on Climate Change) show that the $CO_2$ concentration in the atmosphere, in the absence of any corrective measure, will evolve from a current concentration of 360 ppm to more than 1000 ppm by the end of the $XXI^{st}$ century with significant consequences on the climate change. Capture of the $CO_2$ emissions from high volume sources (for example, thermal power plants), transportation of this $CO_2$ and storage thereof in suitable underground formations is one of the solutions available for reducing greenhouse gas emissions. $CO_2$ geological storage pilot projects exist already, but continuing the deployment of this technology requires high-quality technologies in order to meet the requirements of the regulations that are being set up and to meet public expectations.

Deep saline aquifers have the highest potential for $CO_2$ geological storage among all the geological formations being considered regarding their geographical distribution and their theoretical storage capacity.

The volume of the $CO_2$ injected in an underground geological formation is easily known by measuring the gas flow rate at the wellhead. However, the fate of the $CO_2$ once injected is much more difficult to control: since $CO_2$ can migrate vertically out of the storage formation (to more superficial geological layers or even to the surface) or laterally into the host formation in non-initially planned zones. Furthermore, the $CO_2$ can undergo physico-chemical changes over time, likely to cause it to take different forms, among which are free form (gaseous or supercritical), dissolved form, in brine, or a mineralized form for example.

Thus, monitoring as completely as possible the fate of $CO_2$ has to be carried out in order to meet the regulations in force, and to help towards societal acceptance of this technology. This complete monitoring must involve detecting leakage out of the geological storage formation and quantifying such leaks, as well as a volume and/or mass balance of the $CO_2$ in place in the geological storage formation.

The following documents reflect the state of the art:

Arts, R. et al., 2002. Estimation of the Mass of Injected $CO_2$ at Sleipner Using Time Lapse Seismic-Data, Expanded Abstracts of the 64th EAGE, Florence 2002, paper H016.

Calvert, R., 2005, Insights and Methods for. 4D Reservoir Monitoring and Characterization, SEG/EAGE DISC (Distinguished Lecture Course), 2005.

Chadwick, R. A., Arts, R. et O. Eiken, 2005, 4D Siesmic Quantification of a Growing $CO_2$ Plume at Sleipner, North Sea, In: DORE', A. G. & VINING, B. A. (eds) Petroleum Geology: North-West Europe and Global Perspectives— Proceedings of the $6^{th}$ Petroleum Geology Conference, 1385-1399.

Bourbié, T., Coussy, O. et B. Zinszner, 1987, Acoustics of Porous Media, Editions Technip, Paris.

Rasolofosaon P., Zinszner B., 2004, Laboratory Petroacoustics for Seismic Monitoring Feasibility Study. The Leading Edge, v. 23; no. 3, p. 252-258.

Rasolofosaon, P. N. J. and Zinszner, B. E., 2007. The Unreasonable Success of Gassmann's Theory . . . . Revisited, Journal of seismic Exploration, Volume 16, Number 2-4, 281-301.

Zinszner, B. et F. M. Pellerin, 2007, A Geoscientist's Guide to Petrophysics, Editions Technip, Paris.

Many techniques have been developed by industrialists in order to monitor the evolution of the fluids produced or injected in a porous medium. Among these techniques, the repetitive seismic technology, referred to as 4D seismic technology, is used in the (petroleum or environmental) industry. Such a technique carries out various seismic surveys, at different times (the surveys are generally carried out at one year intervals at least). Thus, specialists can follow the evolution of the fluids of the reservoir under production or of the geological storage site (Calvert, 2005, for example).

The seismic data (velocities), which are estimated from the acquired data, allow obtaining the elastic properties of the fluids produced or injected by means of a theoretical model, generally of poroelastic type (Biot-Gassmann) (for example, Bourbié et al., 1987, Rasolofosaon and Zinszner, 2004 and 2007).

All these techniques have been exploited in the environmental sphere to estimate, from seismic data, the total volume and the total mass of $CO_2$ in place in the subsoil.

For example, Arts et al. (2002) exploit the measurements of the delay taken by the seismic wave to travel through the subsoil layers invaded by the $CO_2$, in relation to a faster propagation in the brine-saturated subsoil, in order to locate the $CO_2$-invaded zone and to estimate the total volume of $CO_2$ in place. These authors use Gassmann's theoretical model (for example, Rasolofosaon and Zinszner, 2004 and 2007). Furthermore, assuming that the mean density of the $CO_2$ under the reservoir conditions (pressure and temperature) are known, they can estimate the total mass of the $CO_2$ in place, which they compare more or less successfully with the mass of $CO_2$ really injected.

In a similar but more sophisticated approach, Chadwick et al. (2005) exploit not only the wave propagation time data, but also the amplitudes of the seismic waves. They obtain somewhat finer estimations of the $CO_2$ distribution and of the total mass of the $CO_2$ in place than the previous authors, without however reaching the three-dimensional distribution of the $CO_2$ saturations as provided by the invention.

The major drawbacks of the previous methods can be summed up in two main points:

First, the previous analyses are essentially based on the analysis of the wave propagation times and amplitudes, and not on a complete inversion of the seismic data, with a really quantitative estimation, at any point of the subsoil, of the elastic parameters (impedances, incompressibility moduli, etc.). Now, by analyzing the times or the amplitudes, it is not possible to perform a true quantitative analysis. In fact, if for example the analysis of the propagation time variations in the storage layer due to $CO_2$ injection is performed, an estimation of the overall velocity variation in the entire layer (and not local, at each point) is obtained, Second, all these methods are based on the use of an elastic model of the porous medium, whose robustness needs no further proof, but whose key parameter estimation (drained incompressibility and shear moduli notably, and grain compressibilities to a lesser extent) still is a problem (for example, Arts 2002 and Calvert et al. 2005).

SUMMARY OF THE INVENTION

The present invention provides a method based on seismic data analysis of quantifying the $CO_2$ in free form in a geological storage site.

The method of the invention allows not utilizing these theoretical models while remaining close to the seismic data alone. The invention uses seismic inversion results (impedances) and exploits the fact that $CO_2$ injection into an aquifer, preferably a deep saline aquifer, is a first drainage physical phenomenon (Zinszner and Pellerin, 2007).

The invention thus relates to a method of monitoring a $CO_2$ geological storage site, from a first set of seismic data imaging a subsoil zone and acquired before a $CO_2$ injection into an underground formation in the zone, and from a second set of seismic data imaging the subsoil zone and acquired after $CO_2$ injection. The method comprises locating the free $CO_2$ plume formed after the injection by carrying out the following stages:

constructing by use of a stratigraphic inversion for each seismic data set a P-wave seismic impedance cube and an S-wave seismic impedance cube;

constructing a density variation cube from the P-wave and S-wave seismic impedance cubes before and after $CO_2$ injection wherein the density variation cube discretizes the subsoil zone into a set of cells;

constructing an incompressibility modulus variation cube from the P-wave and S-wave seismic impedance cubes before and after $CO_2$ injection, wherein the incompressibility modulus variation cube discretizes the subsoil zone into a set of cells; and locating the free $CO_2$ plume in the zone by identifying cells where the density variation is negative and where the incompressibility modulus variation is negative, and of absolute value greater than a given positive threshold to locate the free $CO_2$ plume.

According to the invention, it is also possible to determine a volume of the free $CO_2$ plume by carrying out the following stages:

constructing a $CO_2$ saturation cube in the formation, from a density relative variation cube; and determining the volume of the free $CO_2$ plume by adding all values of the $CO_2$ saturation cube, and by weighting the sum by a mean porosity of the formation and by a volume occupied by an elementary cell of the $CO_2$ saturation cube.

A mass of the free $CO_2$ plume can also be determined by multiplying the volume of the free $CO_2$ plume by a mean density of the $CO_2$.

The $CO_2$ saturation cube can be constructed by carrying out the following stages:

determining an irreducible brine saturation $S_{wi}$ for the formation;

determining a maximum absolute value for said density variation cube and calculating a ratio by dividing the maximum absolute value by $1-S_{wi}$;

constructing a $CO_2$ saturation cube by multiplying each value of the density variation cube by the ratio; and converting the $CO_2$ saturation cube to depth with a time-depth conversion technique.

According to the invention, the integrity of the storage site can be checked by detecting a $CO_2$ leak through analysis of the location of the free $CO_2$ plume. Remediation techniques can then be implemented to stop the leak.

According to the invention, the storage site exploitation conditions can be modified after detecting a transformation of free $CO_2$ by comparison of either the volume of $CO_2$ with a volume of $CO_2$ injected, or of the mass of $CO_2$ with a mass of $CO_2$ injected.

BRIEF DESCRIPTION OF THE DRAWINGS

Other features and advantages of the method according to the invention will be clear from reading the description hereafter of embodiments given by way of non-limitative examples, with reference to the accompanying figures wherein.

DETAILED DESCRIPTION OF THE INVENTION

The present invention provides a method of quantifying the $CO_2$ in free form in a geological storage site, based on the analysis of repetitive seismic data referred to as 4D seismic data.

The method characterizes the $CO_2$ plume by determining the location and the geographical extension of the plume, as well as its volume and mass.

Figure 1:
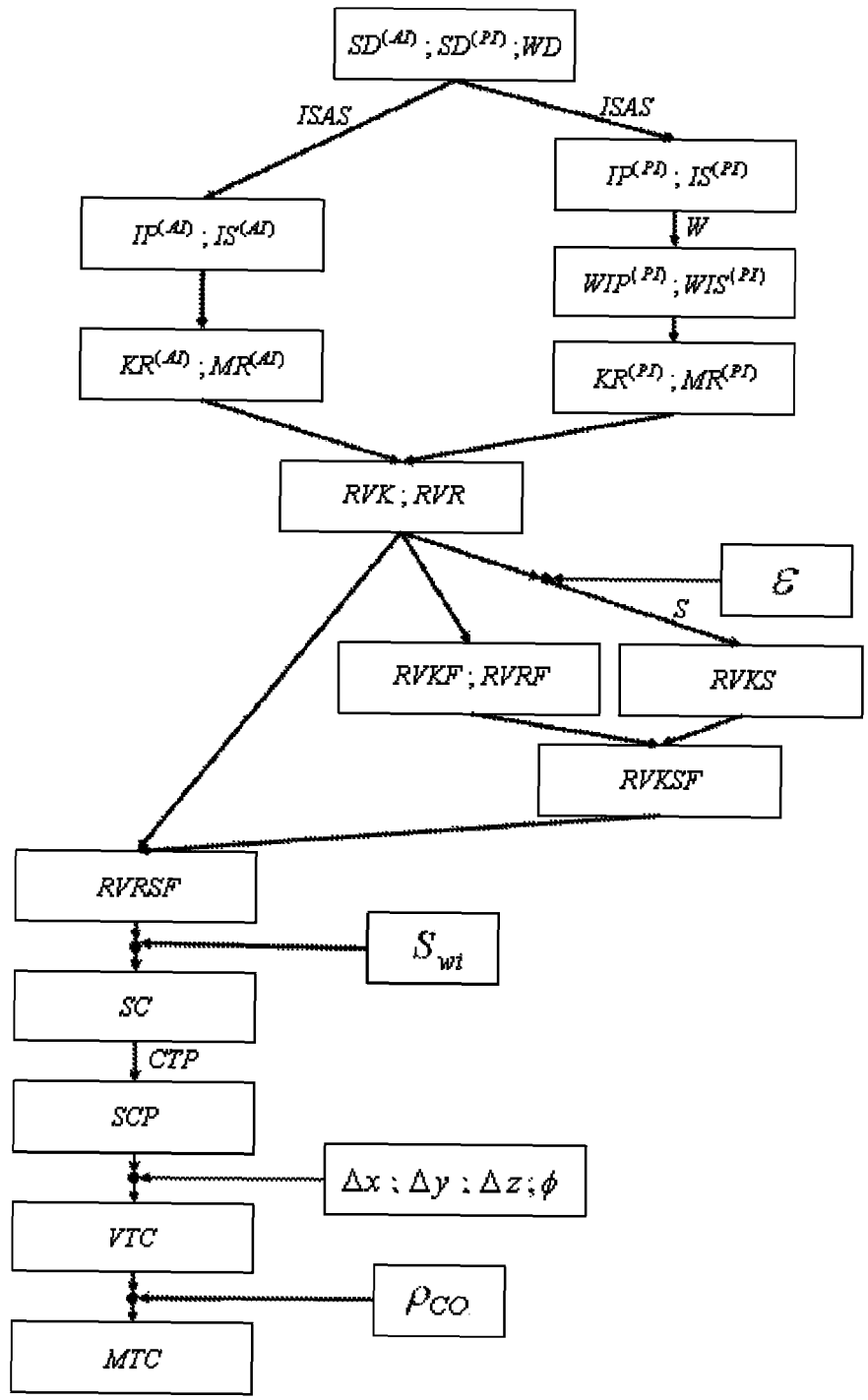
FIG. 1 illustrates the stages of the method according to the invention.

FIG. 1 illustrates the stages of the method according to the invention. It comprises three main stages:

1. Data acquisition and $CO_2$ injection
2. $CO_2$ plume locating by:
   Determining the seismic impedances (or seismic wave velocities)
   Constructing density and incompressibility variation cubes
   Locating the $CO_2$ plume
3. Determining the volume and the mass of the $CO_2$ plume by:
   Constructing a subsoil $CO_2$ saturation cube
   Determining the volume and the mass of the $CO_2$ plume.

1. Data Acquisition and $CO_2$ Injection

A first set of 3D seismic data is first acquired, before $CO_2$ injection (AI) into the aquifer. This first set allows an image of subsoil zone containing the injection aquifer to be obtained. This set is denoted by $SD^{(AI)}$. These data make up a first seismic amplitude cube.

$CO_2$ is injected into the aquifer.

A second set of 3D seismic data is then acquired (after $CO_2$ injection (PI)). This second set allows an image of the same subsoil zone as the one imaged by the first data set to be obtained. This set is denoted by $SD^{(PI)}$. These data make up a second seismic amplitude cube.

As a result two images of a zone of the subsoil containing the injection aquifer are available. As it is known regarding 4D seismic methods, the acquisition device for these seismic data must be substantially the same so as to obtain comparable images.

It is also possible to acquire, with a view to a stratigraphic inversion (stage 2.1), well data denoted by WD. These data comprise density logs, as well as P and S wave velocity logs.

2. $CO_2$ Plume Locating

Locating the $CO_2$ plume in the subsoil is based on the knowledge of the relative variation of the incompressibility modulus and the relative variation of the density of the geological formations of the subsoil invaded by the $CO_2$.

The incompressibility modulus, denoted by K, of a rock is the proportionality coefficient between the isotropic confinement pressure exerted on a sample of the rock and the relative volume variation (or volume deformation) of the sample resulting from this pressure.

Determination of these cubes of variation within the subsoil is based only on the seismic impedances directly obtained from the seismic data.

2.1 Determining the Seismic Impedances (or Seismic Wave Velocities)

Determination of the seismic impedances is based on a stratigraphic inversion of the 4D seismic data cubes. Such a technique is well known.

According to an embodiment, the two seismic amplitude cubes are converted to seismic impedances (or seismic velocities) by a prestack stratigraphic inversion (ISAS). A stratigraphic inversion method is described in the following documents for example:

T. Tonellot, D. Macé, V. Richard, 1999, Prestack Elastic Waveform Inversion Using a priori Information, 69$^{th}$ Ann. Internat. Mtg: Soc. of Expl. Geophys., paper 0231, p. 800-804.

Tonellot T., Macé D. and Richard V. [2001]. Joint Stratigraphic Inversion of Angle-Limited Stacks. 71$^{st}$ SEG Annual International Meeting, Expanded Abstracts, 227-230.

A. S Barnola, B. Andrieux, T. Tonellot et O. Voutay, 2003, Pre-stack Stratigraphic Inversion and Attribute Analysis for Optimal Reservoir Characterization, SEG Expanded Abstracts 22, 1493 (2003); doi:10.1190/1.1817576.

Well data WD allow construction and calibration of an a priori model often used in stratigraphic inversion techniques.

The data obtained after inversion are the P-wave and S-wave impedance cubes, respectively denoted by $IP^{(AI)}$ and $IS^{(AI)}$ for the pre-injection data, and by $IP^{(PI)}$ and $IS^{(PI)}$ for the post-injection data.

All the data used are three-dimensional data cubes. The first two dimensions are horizontal geographical directions x and y, and the "vertical" third dimension is the seismic recording time t. These cubes thus represent a discretization of the subsoil to a set of cells. Each cell is associated with a value of a property as a function of the cube so that the cells of the P-wave impedance cube contain a P-wave impedance value.

For the same depth, the recording time of a set of seismic data acquired at a given time is not the same as the recording time of a second set of seismic data acquired subsequently, because the velocities of propagation of the seismic waves in the rock are modified by the substitution of the $CO_2$ for the brine. Different time scales are involved.

Thus, the time scales are different for the pre- and post-injection impedance data.

As it is well known, the interpretation of 4D seismic data involves a stage of matching the propagation times of the two seismic data sets obtained before and after injection. Such a technique is commonly referred to as warping (W). An example is described in the following document:

DeVault B., et al., 2007, "Prestack 9-C Joint Inversion for Stratigraphic Prediction in the Williston Basin". 77$^{th}$ SEG Annual International Meeting, Expanded Abstracts, 1039-1043.

Thus, the post-injection impedance data $IP^{(PI)}$ and $IS^{(PI)}$ are temporally matched with the pre-injection data $IP^{(AI)}$ and $IS^{(AI)}$ to allow quantitative comparison thereof. The output data are the P-wave and S-wave post-warping impedance seismic data which are respectively denoted by $WIP^{(PI)}$ and $WIS^{(PI)}$ and are expressed in the same time reference frame as the pre-injection impedance data.

2.2 Constructing Density and Incompressibility Variation Cubes

The impedance data are first transformed into cubes of the product of incompressibility modulus K by density ρ of the subsoil. These cubes are denoted by $KR^{(AI)}$ for the pre-injection cube and by $KR^{(PI)}$ for the post-injection cube.

These transformations are performed using the following formulas:

$$KR^{(AI)}(x, y, t) = (IP^{(AI)}(x, y, t))^2 - \frac{4}{3}(IS^{(AI)}(x, y, t))^2 \quad (1)$$

before injection, and $$KR^{(PI)}(x, y, t) = (WIP^{(PI)}(x, y, t))^2 - \frac{4}{3}(WIS^{(PI)}(x, y, t))^2 \quad (2)$$

after injection.

These equations are due to the fact that the velocities of the P waves, $V_p$, and of the waves, $V_s$, and the associated impedances $I_p$ and $I_s$ respect the following equations:

$$\rho V_P^2 = K + \frac{4}{3}\mu;$$

$$\rho V_S^2 = \mu;$$

$$I_P = \rho V_P$$

and $$I_S = \rho V_S$$

The following formulas are deduced therefrom:

$$K\rho = I_P^2 - (4/3)I_S^2 \text{ and } \mu\rho = I_S^2$$

Cubes $KR^{(AI)}$ and $KR^{(PI)}$ are then transformed into cubes of the product of the rigidity (or shear modulus μ) by density ρ of the subsoil. These cubes are denoted by $MR^{(AI)}$ for the pre-injection cube and by $MR^{(PI)}$ for the post-injection cube.

These transformations are performed using the following formulas:

$$MR^{(AI)}(x,y,t) = (IS^{(AI)}(x,y,t))^2 \text{ before injection, and} \quad (3)$$

$$MR^{(PI)}(x,y,t) = (WIS^{(PI)}(x,y,t))^2 \text{ after injection.} \quad (4)$$

The cubes of the relative variations of products K.ρ and μ.ρ, due to the injection of $CO_2$, are respectively denoted by RVKR and RVMR. They are deduced from the following formulas:

$$RVKR(x, y, t) = \frac{KR^{(PI)}(x, y, t) - KR^{(AI)}(x, y, t)}{KR^{(AI)}(x, y, t)}, \quad (5)$$

and $$RVMR(x, y, t) = \frac{MR^{(PI)}(x, y, t) - MR^{(AI)}(x, y, t)}{MR^{(AI)}(x, y, t)} \quad (6)$$

By disregarding the pressure effects and the variations of the shear modulus μ due to the substitution of the $CO_2$ for the brine, the density relative variation, RVR, and incompressibility modulus relative variation, RVK, cubes are obtained from the following formulas:

$$RVR(x,y,t) = RVMR(x,y,t), \text{ and} \quad (7)$$

$$RVK(x,y,t) = RVKR(x,y,t) - RVMR(x,y,t) \quad (8)$$

2.3 Locating the $CO_2$ Plume

Since the $CO_2$ has a lower incompressibility modulus and density than the brine, substituting the $CO_2$ for the brine tends to decrease the density and the effective incompressibility modulus of the rock in the injection zone. The subsoil zones, where density $\rho$ decreases, are located by calculating the filtered cube of the relative density variations which are denoted by RVRF and defined by:

$$RVRF(x, y, t) = \begin{cases} 1 & \text{if } RVR(x, y, t) < 0 \\ 0 & \text{if } RVR(x, y, t) > 0 \end{cases} \quad (9)$$

Similarly, the subsoil zones where incompressibility modulus K decreases are located by calculating the filtered cube of the relative incompressibility modulus variations, denoted by RVKF and defined by:

$$RVKF(x, y, t) = \begin{cases} 1 & \text{if } RVK(x, y, t) < 0 \\ 0 & \text{if } RVK(x, y, t) > 0 \end{cases} \quad (10)$$

Furthermore, as a result of the many noise sources, essentially linked with the acquisition, this incompressibility modulus decrease is spatially coherent only above a certain incompressibility modulus relative variation threshold $\epsilon$. The sufficient decrease zones for subsoil incompressibility modulus K are located by calculating the thresholded cube of the incompressibility modulus relative variations, denoted by RVKS and defined by:

$$RVKS(x, y, t) = \begin{cases} 1 & \text{if } |RVK(x, y, t)| > \varepsilon \\ 0 & \text{if } |RVK(x, y, t)| < \varepsilon \end{cases} \quad (11)$$

It can be noted that cube RVKS is simply obtained through thresholding (S) of cube RVK of the incompressibility modulus relative variations.

Figure 2:
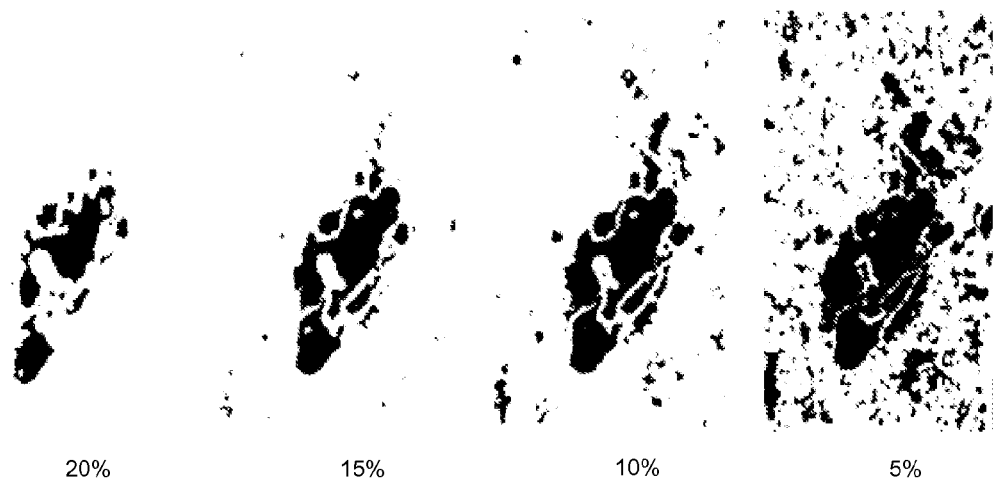
FIG. 2 shows a horizontal section, at a set depth at the top of the $CO_2$ plume, of the thresholded cube RVKS of the incompressibility modulus relative variations for four values of the threshold.

FIG. 2 shows a horizontal section, at fixed depth at the level of the top of the $CO_2$ plume, of the thresholded cube RVKS of the incompressibility modulus relative variations for four values of the threshold: $\epsilon$=5%, 10%, 15% and 20%. The points of the cube associated with values above the threshold are shown in black.

The zones exhibiting both a density $\rho$ decrease and a sufficient incompressibility modulus K decrease are then located by calculating the thresholded and filtered cube of the incompressibility modulus relative variations, denoted by RVKSF, and defined by:

$$RVKSF(x,y,t) = RVRF(x,y,t) \times RVKF(x,y,t) \times RVKS(x,y,t) \quad (12)$$

Finally, cube RVR of the density relative variations is filtered by the previous cube so as to obtain the thresholded and filtered cube of the density relative variations, denoted by RVRSF and defined by:

$$RVRSF(x,y,t) = RVKSF(x,y,t) \times RVR(x,y,t) \quad (13)$$

This cube thus has a set of cells of value 1 if the cell contains $CO_2$ and of value 0 if it does not, thus locating the geographical extension of the $CO_2$ plume.

Figure 3:
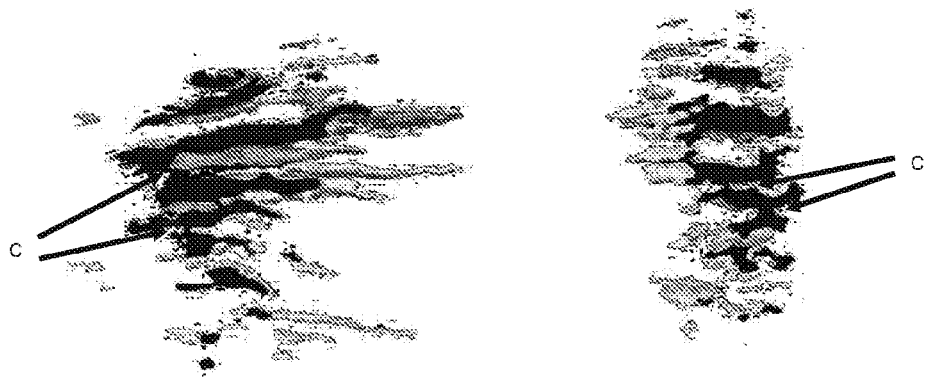
FIG. 3 shows three-dimensional views of the complete $CO_2$ plume, intersected by a southwest-northeast (left) and southeast-northwest (right) oriented vertical plane.

FIG. 3 illustrates a result. It shows three-dimensional views of the complete $CO_2$ plume intersected by a southwest-northeast (left) and southeast-northwest (right) oriented vertical plane. The cut plane is shown in black, and only the part of the plume located at the back of the cut plane is shown (in grey). Some connections between the various layers that make up the plume, which are made visible by seismic techniques, are shown by arrows and by letter C.

3. Determining the Volume and the Mass of the $CO_2$ Plume

According to the invention, a subsoil $CO_2$ saturation cube is determined in order to determine the volume and the mass of the $CO_2$ plume.

3.1 Constructing a Subsoil $CO_2$ Saturation Cube

Determination of the saturation within the subsoil is based on the knowledge of the density relative variation RVRSF of the geological formations of the subsoil invaded by the $CO_2$.

In the zones of maximum density relative variation, the $CO_2$ injection has however not totally expelled the brine in place. Some brine remains trapped and the brine saturation is close to the so-called irreducible brine saturation, denoted by $S_{wi}$ ($0 \leq S_{wi} \leq 1$). This parameter, which is known to petrophysicists, is a characteristic of the porous medium and it is a new input parameter. The typical values of this parameter in the very porous and very permeable media selected for $CO_2$ storage are often well below 0.1 and they can be as low as 0.05. The corresponding maximum $CO_2$ saturation denoted by $S_{CO_2}^{(MAX)}$ is given by the following formula:

$$S_{CO_2}^{(MAX)} = 1 - S_{wi} \quad (14)$$

The minimum $CO_2$ saturation is zero and it corresponds to the zones not yet reached by the $CO_2$ plume. Besides, the relative variation of the rock density due to the substitution of $CO_2$ for brine being proportional to the $CO_2$ saturation, the $CO_2$ saturation cube, identified by SC, is obtained by the formula:

$$SC(x, y, t) = RVRSF(x, y, t) \frac{S_{CO_2}^{(MAX)}}{RVRSF^{(MAX)}} \quad (15)$$

where $RVRSF^{(MAX)}$ designates the maximum value (in absolute value) of the density relative variations calculated in cube RVRSF. This particular density variation value corresponds to the irreducible brine saturation condition.

Figure 4:
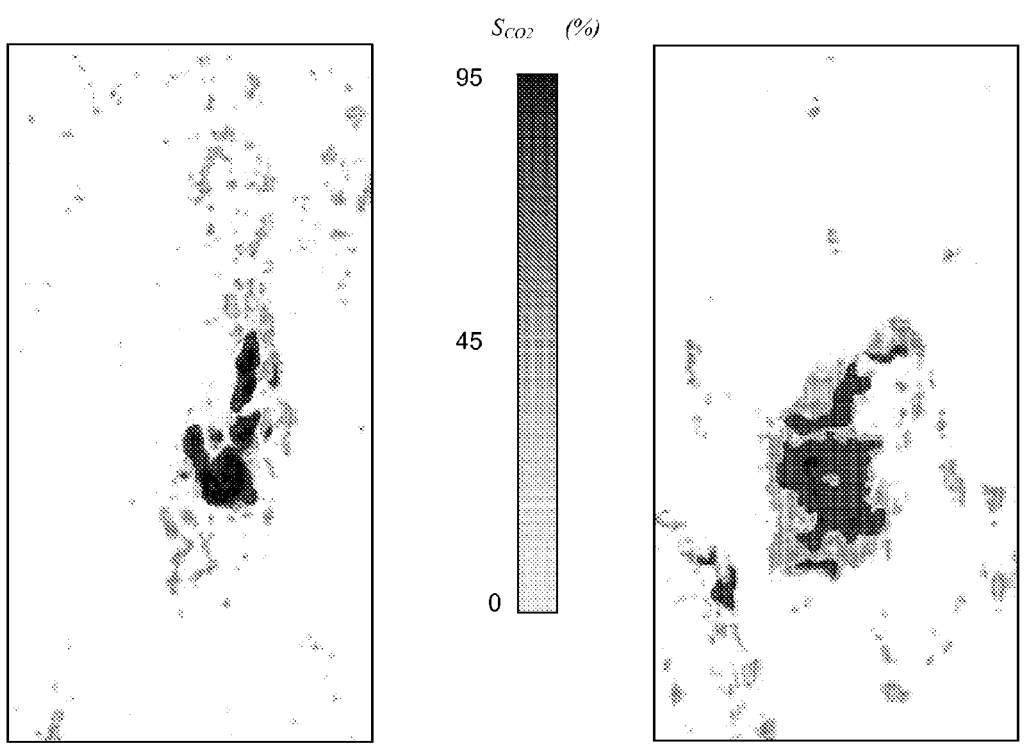
FIG. 4 illustrates horizontal sections at the level of the top (left) and the base (right) of the $CO_2$ plume of the $CO_2$ saturation cube SC.

FIG. 4 illustrates horizontal sections at the level of the top (left) and of the base (right) of the $CO_2$ plume of the $CO_2$ saturation cube SC. The $CO_2$ saturation is identified by $S_{CO2}$ on the scale.

According to an embodiment, the data are transformed to depth. As mentioned above, in all the previous data, the third "vertical" dimension is the seismic recording time t. In the next stage, time variable t is transformed to depth variable z. A known technique is therefore used which is time-depth conversion (TDC).

Time-depth conversion (TDC) can be carried out on all the previous data and, in particular, the $CO_2$ saturation cube SC. Cube SC is thus converted to a $CO_2$ saturation depth cube denoted by SCP.

3.2 Determining the Volume and the Mass of the $CO_2$ Plume

The data cubes have cells known as "voxels" (contraction of the terms "volumetric pixels"). These cells are of known dimensions $\Delta x$, $\Delta y$ and $\Delta z$. In the horizontal directions, these dimensions Δx and Δy are known as "inter-traces". They are acquisition data corresponding to the distances between the successive recording points for the same shot point respectively in directions x and y. Vertical dimension Δz is the seismic data recording sampling rate Δz converted to depth by time-depth conversion.

The total volume of $CO_2$, denoted by VTC, can be calculated by adding up all the values of the $CO_2$ saturation depth cube SCP, and by weighting the result by the volume occupied by a cell and by the mean porosity $\phi$ of the rock, i.e.:

$$VTC = \phi \times \Delta x \times \Delta y \times \Delta z \sum_{x,y,z} SCP(x, y, z) \quad (16)$$

The mean porosity $\phi$ of the rock, defined by the ratio of the volume of the pores to the total volume of the rock, is measured or estimated from logs or measurements on samples taken in wells (for example, Calvert, 2005). This quantity is a characteristic of the porous medium and it is a new input parameter. The thermodynamic conditions (fluid pressure and temperature) at the level of the injection point are generally known. From these data, thermodynamicists can calculate the mean density $\rho_{CO_2}$ of the $CO_2$ from tables of physical constants or by means of references such as the reference as follows:

Span, R., Wagner, W., 1996 "A New Equation of State for Carbon Dioxide Covering the Fluid Region from the Triple-Point Temperature to 100 K at Pressures up to 800 MPa", J. Phys. Chem. Ref. Data, Vol. 25, No. 6, pp. 1509-1596.

By introducing this mean $CO_2$ density, $\rho_{CO_2}$, the total mass MTC of the $CO_2$ can be estimated using the following formula:

$$MTC = \rho_{CO_2} \times VTC \quad (17)$$

Results

Figure 5:
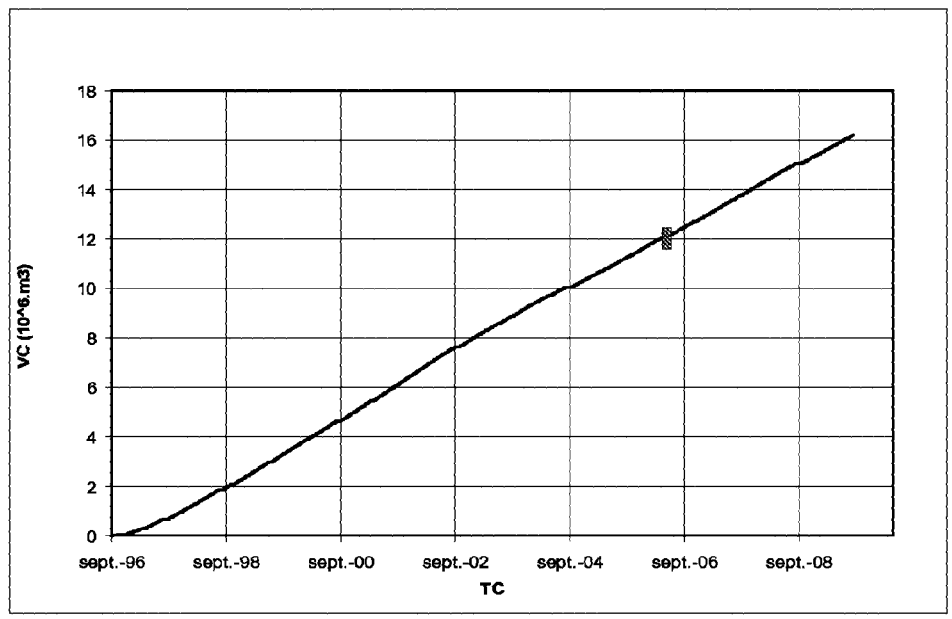
FIGS. 5 and 6 illustrate the quality of the results provided by the method by comparing the total volume (FIG. 5) of $CO_2$ under downhole conditions and the total mass (FIG. 6) of $CO_2$ injected as a function of the calendar time, as well as the estimations obtained from the method according to the invention.
Figure 6:
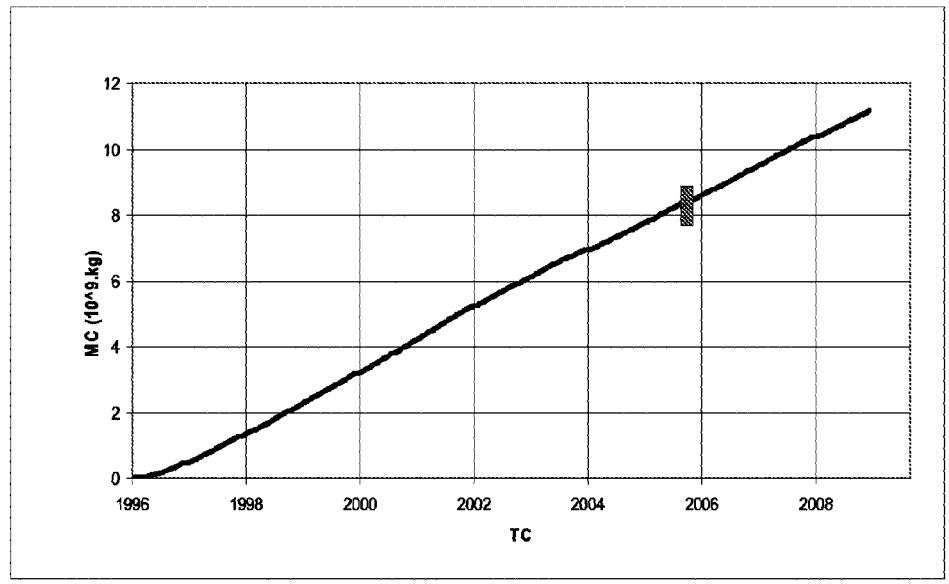

FIGS. 5 and 6 illustrate the quality of the results provided by the method according to the invention for estimating the volume and the mass of $CO_2$ in place.

FIG. 5 illustrates the total volume (VC) of $CO_2$ under downhole conditions as a function of the calendar time (TC). The curve corresponds to the injection data, the grey rectangle represents the estimation of the volume of free $CO_2$ provided by the method according to the invention.

FIG. 6 illustrates the total mass (MC) of $CO_2$ under downhole conditions as a function of the calendar time (TC). The curve corresponds to the injection data, the grey rectangle represents the estimation of the mass of free $CO_2$ provided by the method according to the invention.

It can be observed that the estimation meets the data, thus validating the method.

Application

The method according to the invention for characterizing in detail, and not only globally, a $CO_2$ plume can be integrated in a method for injecting $CO_2$ into an underground formation, notably by allowing better description of the variation over time of the fluid distributions in the geological $CO_2$ storage level.

The method allows partition of the geological $CO_2$ storage level, to locate the various subsoil compartments and the connectivities between these various compartments. This precise information allows location and estimation of the $CO_2$ volumes actually stored in the subsoil and to control the integrity of the geological cap rocks.

During geological storage of an acid gas such as $CO_2$, it is necessary to check that the underground reservoir (porous medium) into which the gas is injected is fully tight. However, gas may escape from this natural reservoir. In order to remedy such leaks, various techniques, referred to as "remediation" techniques, have been developed by operators.

After determining the geographical extension, the volume and the mass of the $CO_2$ plume, the integrity of the storage site can be checked.

In fact, just as the spatial resolution of the method allows location with precision the close connections between the various layers that make up the $CO_2$ plume (see C in FIG. 3), the method of the invention allows not only fine specification in 3D of the lateral extension of the plume, but also to detect unambiguously any free $CO_2$ leak through the cap rock which is in the upper part of the storage zone. The high spatial resolution of the method in this precise case is a necessity. Detecting possible free $CO_2$ leaks allows these remediation methods to be implemented to prevent such leaks.

Furthermore, it is essential to monitor the evolution of the injected gas in order to determine whether storage is successful in the desired place, to evaluate the amount actually stored and to control the reservoir integrity by checking that there is no free $CO_2$ leak. This information also allows determination if other injection wells are necessary.

More generally, our understanding of the storage mechanisms can be improved since the free $CO_2$ does not represent all of the $CO_2$ injected because it has been transformed. The method allows providing finer and more precise information in order to constrain the storage behaviour model. The method, by allowing better monitoring the spatial evolution of the fluid contacts upon injection, allows confirmation or, on the contrary, to invalidate the flow model and, consequently, to follow more distinctly the $CO_2$ front stored in the subsoil.

This allows better management of $CO_2$ injection and of the entire industrial process. For example, it can lead to different storage site exploitation conditions: location of the new injection well, injection pressures modification, use of additives, etc.

It can also be noted that the monitoring method according to the invention does not require drilling new wells in the storage zone, which contributes to considerably reducing leak risks. Well data are indeed not essential and, if required for inversion, it is possible and even advisable to drill far away from the storage zone so as to prevent leak problems.

The invention claimed is:

1. A method of monitoring a $CO_2$ geological storage site, from a first set of seismic data imaging a subsoil zone which are acquired before a $CO_2$ injection in an underground formation of the zone, and from a second set of seismic data imaging the subsoil zone which are acquired after $CO_2$ injection, to locate a free $CO_2$ plume formed after the injection comprising:

constructing by using stratigraphic inversion for each seismic data set a P-wave seismic impedance cube and an S-wave seismic impedance cube;

constructing a density variation cube from the P-wave and S-wave seismic impedance cubes before and after $CO_2$ injection wherein the density variation cube discretizes the subsoil zone into a set of cells;

constructing an incompressibility modulus variation cube from the P-wave and S-wave seismic impedance cubes before and after $CO_2$ injection wherein the incompressibility modulus variation cube discretizes the subsoil zone into a set of cells; and locating the free $CO_2$ plume in the zone by identifying cells where the density variation is negative and the incompressibility modulus variation is negative and has an absolute value greater than a positive threshold.

2. A method as claimed in claim 1, wherein a volume of the free $CO_2$ plume is determined by:
constructing a cube of $CO_2$ saturation in the formation from the density variation cube; and
determining the volume of the free $CO_2$ plume by summing all values of the $CO_2$ saturation cube and weighting the sum by a mean porosity of the formation and by a volume occupied by an elementary cell of the saturation cube.

3. A method as claimed in claim 2, wherein a mass of the free $CO_2$ plume is also determined by multiplying the volume of the free $CO_2$ plume by a mean density of the $CO_2$.

4. A method as claimed in claim 2, wherein the $CO_2$ saturation cube is constructed by:
determining an irreducible brine saturation $S_{wi}$; for the formation;
determining a maximum absolute value for the density variation cube and calculating a ratio by dividing the maximum absolute value by $1-S_{wi}$;
constructing a $CO_2$ saturation cube by multiplying each value of the density variation cube by the ratio; and
converting the saturation cube to depth by performing a time-depth conversion.

5. A method as claimed in claim 3, wherein the $CO_2$ saturation cube is constructed by:
determining an irreducible brine saturation $S_{wi}$ for the formation;
determining a maximum absolute value for the density variation cube and calculating a ratio by dividing the maximum absolute value by $1-S_{wi}$;
constructing a $CO_2$ saturation cube by multiplying each value of the density variation cube by the ratio; and
converting the saturation cube to depth by performing a time-depth conversion.

6. A method as claimed in claim 2, wherein integrity of the storage site is checked by detecting a $CO_2$ leak by analysis of the location of the free $CO_2$ plume and stopping the detected leak.

7. A method as claimed in claim 3, wherein integrity of the storage site is checked by detecting a $CO_2$ leak by analysis of the location of the free $CO_2$ plume and stopping the detected leak.

8. A method as claimed in claim 4, wherein integrity of the storage site is checked by detecting a $CO_2$ leak by analysis of the location of the free $CO_2$ plume and stopping the detected leak.

9. A method as claimed in claim 5, wherein integrity of the storage site is checked by detecting a $CO_2$ leak by analysis of the location of the free $CO_2$ plume and stopping the detected leak.

10. A method as claimed in claim 2, wherein exploration of the storage site is modified after detecting a transformation of free $CO_2$ by a comparison of a volume of free $CO_2$ with a volume of $CO^2$ that has been injected.

11. A method as claimed in claim 3, wherein exploration of the storage site is modified after detecting a transformation of free $CO_2$ by a comparison of a volume of free $CO_2$ with a volume of $CO^2$ that has been injected.

12. A method as claimed in claim 4, wherein exploration of the storage site is modified after detecting a transformation of free $CO_2$ by a comparison of a volume of free $CO_2$ with a volume of $CO^2$ that has been injected.

13. A method as claimed in claim 5, wherein exploration of the storage site is modified after detecting a transformation of free $CO_2$ by a comparison of a volume of free $CO_2$ with a volume of $CO^2$ that has been injected.

14. A method as claimed in claim 6, wherein exploration of the storage site is modified after detecting a transformation of free $CO_2$ by a comparison of a volume of free $CO_2$ with a volume of $CO^2$ that has been injected.

15. A method as claimed in claim 7, wherein exploration of the storage site is modified after detecting a transformation of free $CO_2$ by a comparison of a volume of free $CO_2$ with a volume of $CO^2$ that has been injected.

16. A method as claimed in claim 8, wherein exploration of the storage site is modified after detecting a transformation of free $CO_2$ by a comparison of a volume of free $CO_2$ with a volume of $CO^2$ that has been injected.

17. A method as claimed in claim 9, wherein exploration of the storage site is modified after detecting a transformation of free $CO_2$ by a comparison of a volume of free $CO_2$ with a volume of $CO^2$ that has been injected.

18. A method as claimed in claim 2, wherein exploration of the storage site is modified after detecting a transformation of free $CO_2$ by a comparison of a mass of the free $CO_2$ with a mass of $CO_2$ that has been injected.

19. A method as claimed in claim 3, wherein exploration of the storage site is modified after detecting a transformation of free $CO_2$ by a comparison of a mass of the free $CO_2$ with a mass of $CO_2$ that has been injected.

20. A method as claimed in claim 4, wherein exploration of the storage site is modified after detecting a transformation of free $CO_2$ by a comparison of a mass of the free $CO_2$ with a mass of $CO_2$ that has been injected.

21. A method as claimed in claim 5, wherein exploration of the storage site is modified after detecting a transformation of free $CO_2$ by a comparison of a mass of the free $CO_2$ with a mass of $CO_2$ that has been injected.

22. A method as claimed in claim 6, wherein exploration of the storage site is modified after detecting a transformation of free $CO_2$ by a comparison of a mass of the free $CO_2$ with a mass of $CO_2$ that has been injected.

23. A method as claimed in claim 7, wherein exploration of the storage site is modified after detecting a transformation of free $CO_2$ by a comparison of a mass of the free $CO_2$ with a mass of $CO_2$ that has been injected.

24. A method as claimed in claim 8, wherein exploration of the storage site is modified after detecting a transformation of free $CO_2$ by a comparison of a mass of the free $CO_2$ with a mass of $CO_2$ that has been injected.

25. A method as claimed in claim 9, wherein exploration of the storage site is modified after detecting a transformation of free $CO_2$ by a comparison of a mass of the free $CO_2$ with a mass of $CO_2$ that has been injected.

* * * * *